(12) United States Patent
McNamara

(10) Patent No.: US 11,587,411 B2
(45) Date of Patent: *Feb. 21, 2023

(54) SUSTAINED AUTHENTICATION OF A CUSTOMER IN A PHYSICAL ENVIRONMENT

(71) Applicant: NCR Corporation, Atlanta, GA (US)

(72) Inventor: Michael Robertson McNamara, Dundee (GB)

(73) Assignee: NCR Corporation, Atlanta, GA (US)

( * ) Notice: Subject to any disclaimer, the term of this patent is extended or adjusted under 35 U.S.C. 154(b) by 608 days.

This patent is subject to a terminal disclaimer.

(21) Appl. No.: 16/676,653

(22) Filed: Nov. 7, 2019

(65) Prior Publication Data

US 2020/0074816 A1  Mar. 5, 2020

Related U.S. Application Data

(63) Continuation of application No. 12/004,350, filed on Dec. 20, 2007, now Pat. No. 10,540,861.

(51) Int. Cl.
| | |
|---|---|
| G07F 19/00 | (2006.01) |
| G06Q 20/42 | (2012.01) |
| G06Q 20/32 | (2012.01) |
| H04L 9/32 | (2006.01) |
| G06T 7/70 | (2017.01) |
| G06Q 20/40 | (2012.01) |

(52) U.S. Cl.
CPC ....... *G07F 19/207* (2013.01); *G06Q 20/3224* (2013.01); *G06Q 20/40* (2013.01); *G06Q 20/42* (2013.01); *G06T 7/70* (2017.01); *G07F 19/20* (2013.01); *H04L 9/3231* (2013.01); *G06T 2207/30241* (2013.01)

(58) Field of Classification Search
CPC ..... G07F 19/207; G06T 7/70; G06Q 20/3224; G06Q 20/40
USPC .......................................................... 235/379
See application file for complete search history.

(56) References Cited

U.S. PATENT DOCUMENTS

| | | | | |
|---|---|---|---|---|
| 10,540,861 | B2* | 1/2020 | McNamara | G06Q 20/3224 |
| 11,188,637 | B1* | 11/2021 | Lawson | G06N 7/005 |
| 2008/0191860 | A1* | 8/2008 | Flook | G07F 19/20 |
| | | | | 340/506 |
| 2017/0053284 | A1* | 2/2017 | Votaw | G06Q 20/3278 |
| 2017/0344965 | A1* | 11/2017 | Watson | G06Q 20/3224 |

* cited by examiner

*Primary Examiner* — Ahshik Kim
(74) *Attorney, Agent, or Firm* — Schwegman, Lundberg & Woessner

(57) ABSTRACT

A system for use in allowing a user to conduct one or more transactions at one or more touchpoints in a business facility includes an authentication component, a tracking component, and a control component. The authentication component is configured to authenticate the user as a person allowed to conduct the one or more transactions. The tracking component is configured to track the user's location within the facility as the user moves through the facility. The control component is configured (a) to receive authentication information from the authentication component, (b) to receive location information from the tracking component, (c) to use the location information to recognize that the user has moved into position to engage one of the touchpoints, and (d) to deliver a message to the touchpoint authorizing the touchpoint to engage in one or more transactions with the user.

20 Claims, 5 Drawing Sheets

| USER ID | GRID LOCATION | IMAGE |
|---------|---------------|-------|
|         |               |       |
|         |               |       |
|         |               |       |
|         |               |       |
|         |               |       |
|         |               |       |

FIG. 5

| TOUCHPOINT ID |
|---------------|
| USER ID |
| IMAGE |
| AUTH. CODE |

FIG. 6

SUSTAINED AUTHENTICATION OF A CUSTOMER IN A PHYSICAL ENVIRONMENT

This application is a Continuation of U.S. patent application Ser. No. 12/004,350, filed Dec. 20, 2007, which is herein incorporated by reference in its entirety.

BACKGROUND

There are many business environments in which access to certain areas or certain information is restricted to people who have authorization for such access. The financial services industry, particularly in banking, is one area where such limited access is crucial. Access to financial records is typically restricted to the individuals or businesses to whom the records relate and to the authorized personnel of the institutions who maintain those records. Any person wishing to access a financial record must typically undergo an authentication procedure to prove that that person does, in fact, have authority to review the record.

In the banking industry, for example, a person wishing to access an account held at a banking institution through any one of multiple channels (e.g., at a physical branch, by telephone, or through the Internet) must successfully complete an authorization process before access will be granted. One common authorization technique in the banking industry is a card-and-PIN combination, in which a person wishing to conduct a transaction through a banking machine (e.g., an automated teller machine, or ATM) or with a human teller presents a bank card and enters a PIN (personal identification number) code. If the PIN code entered by the user matches the PIN code encrypted on the card, the authentication process is successful and the user is allowed to access the corresponding accounts and to conduct secure transactions involving those accounts.

Another common, and very simple, authentication technique used for transactions conducted in person at a physical branch is a visual inspection of a government-issued photo-identification document, such as a driver's license or passport. If the person presenting the document appears clearly to be the person depicted on the document, the person is granted access to secure information that is linked to that person or that document.

Certain business establishments allow users to engage in transactions at multiple locations, or touchpoints, within a facility. A banking establishment, for example, typically allows users to engage in business through self-service terminals, such as ATMs, and at full-service teller stations, where the users conduct transactions with the assistance of human tellers. In these establishments, the user must undergo authentication at each of the touchpoints, even when all of the touchpoints are contained within single physical establishment (e.g., a bank building) that is fully controlled by the business establishment. In a banking facility, for example, it is very common for a user to conduct a cash withdrawal through an ATM and then conduct some other transaction (e.g., a check deposit) with the help of a teller. In these situations, the user is typically required to undergo authentication once at the ATM (usually by card-and-PIN) and again at the teller station (usually by card-and-PIN or by photo-identification).

SUMMARY

A system for use in allowing a user to conduct one or more transactions at one or more touchpoints in a business facility includes an authentication component, a tracking component, and a control component. The authentication component is configured to authenticate the user as a person allowed to conduct the one or more transactions. The tracking component is configured to track the user's location within the facility as the user moves through the facility. The control component is configured (a) to receive authentication information from the authentication component, (b) to receive location information from the tracking component, (c) to use the location information to recognize that the user has moved into position to engage one of the touchpoints, and (d) to deliver a message to the touchpoint authorizing the touchpoint to engage in one or more transactions with the user.

In some systems, the control component is also configured to use the location information to recognize that the user has moved away from the touchpoint and to deliver a second message to the touchpoint indicating that the user has moved away. The control component is also configured in some systems to use the location information to recognize that the user has moved into position to engage a second one of the touchpoints and to deliver a message to the second touchpoint authorizing the second touchpoint to engage in one or more transactions with the user.

In some systems, the authentication component includes a terminal configured to authenticate the user when a code provided to the terminal by the user matches a code stored on a token carried by the user, such as a card that the user inserts into the terminal.

In some systems, the tracking component includes a visual-tracking system that includes one or more video cameras positioned within the facility. The tracking component is often configured to assess the user's location within a grid imposed on the facility, and the control component is configured to compare the user's location within the grid to one or more fixed grid locations associated with one or more of the touchpoints.

In some systems, the control component is configured to include information identifying the user or an image depicting the user in the message delivered to the touchpoint.

Other features and advantages will become apparent from the description and claims that follow.

BRIEF DESCRIPTION OF THE DRAWINGS

FIG. 5 shows a structure for a table of user records maintained by the control system of FIG. 4.

FIG. 6 shows a structure for an authentication packet created by the control system of FIG. 4.

DETAILED DESCRIPTION

Described below is a technique that allows the user of a physical business establishment, or facility, to conduct secure transactions at multiple touchpoints within the facility without undergoing a separate authentication process at each of the touchpoints. The technique allows the business entity that operates the facility to transfer the user's authentication from one touchpoint to another within the facility. One result is a business environment that is much more efficient and much less frustrating for both the business entity and the user. Tangible results include reduced wait times for users and greater transaction throughput within the business establishment.

Figure 1:
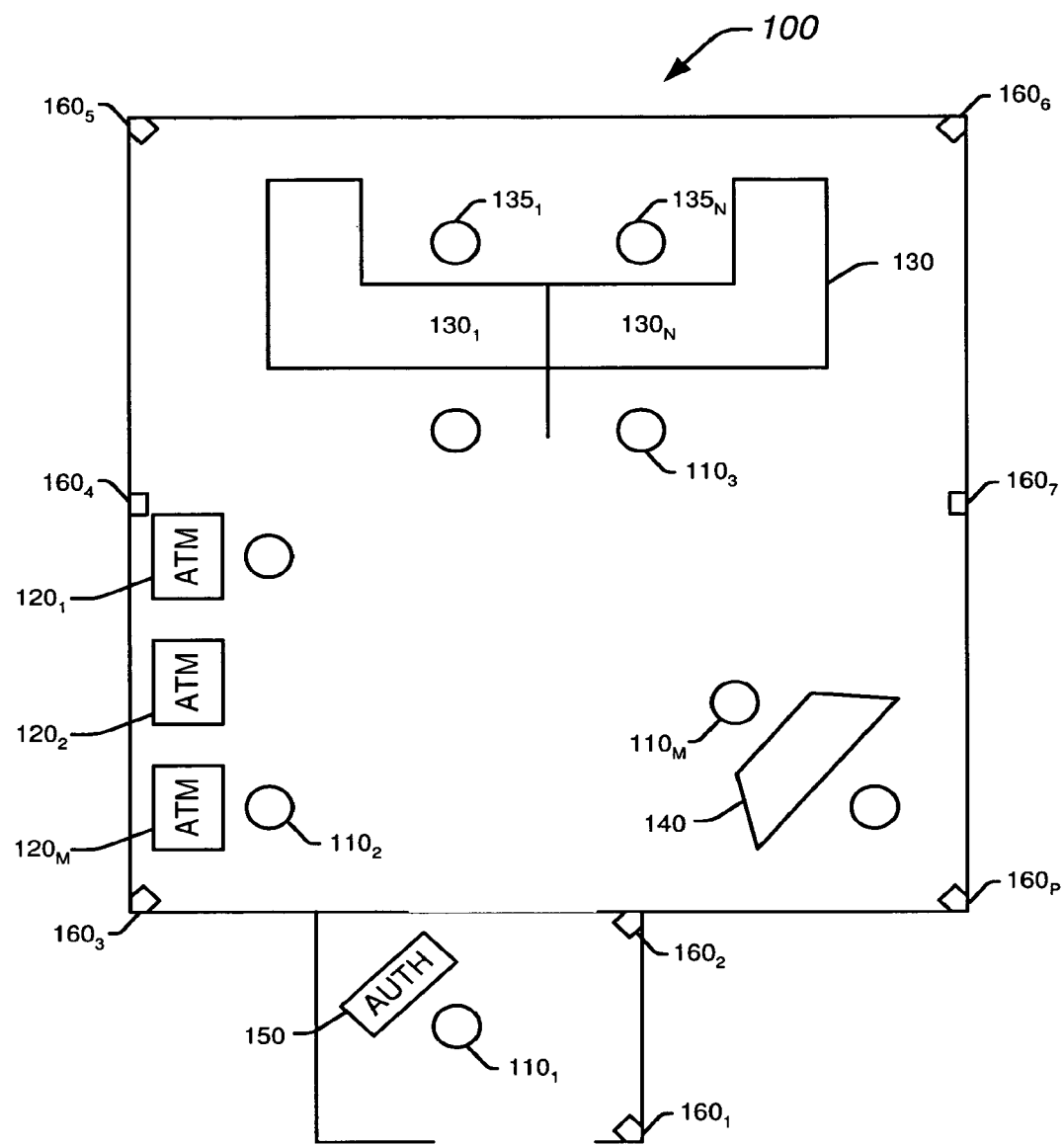
FIG. 1 is plan view of a facility 100 in which users of the facility are able to conduct secure transactions at multiple touchpoints.

FIG. 1 is plan view of a facility 100 in which users of the facility are able to conduct secure transactions at multiple touchpoints, each requiring authentication of the users, without undergoing an authentication process at each touchpoint. As an example, the facility 100 is described here in terms of a banking environment, such as a banking facility in which users $110_{1-M}$ are able to conduct transactions at three types of touchpoints—at a self-service station that includes one or more self-service terminals $120_{1-P}$, such as ATMs, at which bank users conduct secure transactions to completion without assistance from a bank representative; at a full-service station 130 that includes one or more teller terminals $130_{1-N}$ at which bank users conduct secure transactions with the assistance of bank representatives $135_{1-N}$; and at a specialty station 140, at which bank users engage in special transactions (e.g., taking loans) that require an even higher degree of service from bank representatives.

The facility 100 described here is equipped with a complex authentication-and-tracking system that allows each user to undergo authentication once and then passes the user's authentication from touchpoint to touchpoint as the user moves throughout the facility 100 and engages the various touchpoints. As a user $110_1$ enters the facility 100, the user engages an authentication terminal 150, at which the user undergoes the authentication process (e.g., by inserting a bankcard to the authentication terminal 150 and entering a PIN code that matches the code encrypted on the card). At the same time, cameras $160_{1-P}$ mounted throughout the facility 100 acquire images of the user that are used by a visual-tracking system to follow the user's movement through the facility at all times. Visual-tracking systems with these capabilities are known in the art and are not described in any detail here. One such system is developed by Accenture Technology Labs and is described at www.accenture.com/Global/Services/Accenture_Technology_Labs/R_and_I/VisualTracking.htm. Other components of the authentication-and-tracking system are described in detail below.

Figure 2:
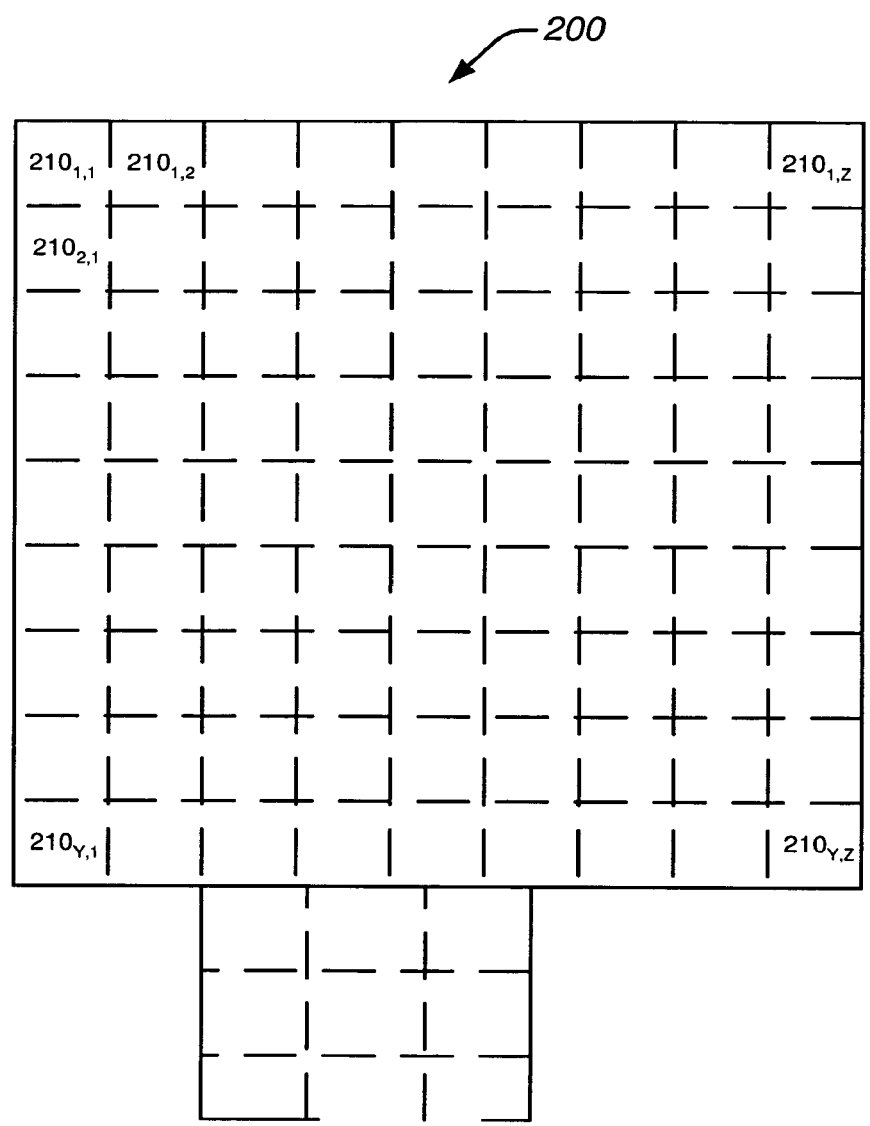
FIG. 2 shows the layout of a virtual grid imposed over the facility of FIG. 1.

FIG. 2 shows a virtual grid 200 that the authentication-and-tracking system lays over the facility 100. The grid 200 divides the facility 100 into a multitude of grid zones $210_{(1-Y,1-Z)}$ through which each of the users must move while within the facility 100. For each customer in the facility 100, the visual-tracking system is able to identify at all times which of the zones the user is standing in.

Figure 3:
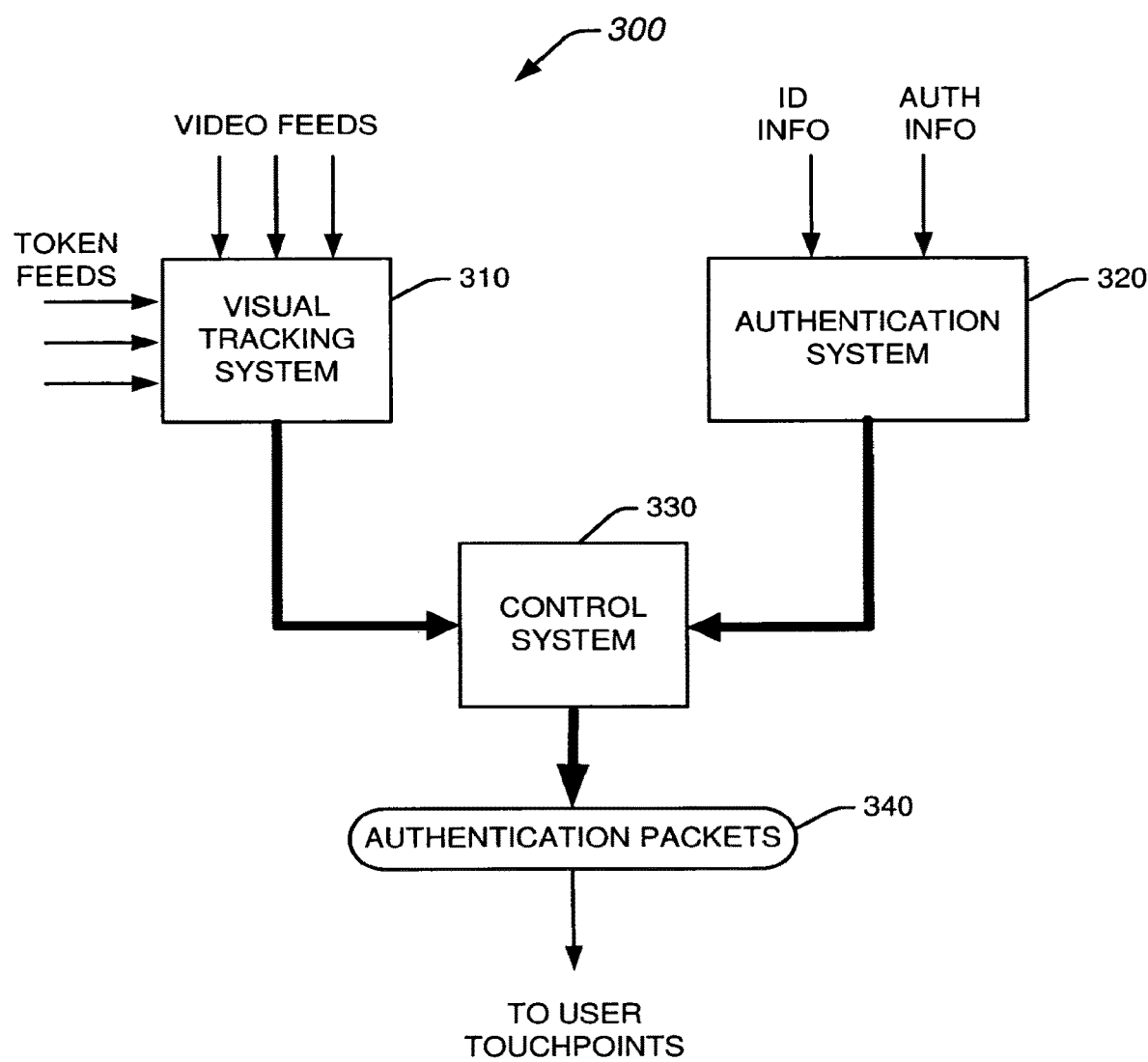
FIG. 3 shows various components of an authentication-and-tracking (A&T) system for use in the facility of FIG. 1.

FIG. 3 shows various components of the authentication-and-tracking (A&T) system 300. One of these components is the visual-tracking system 310 described above. The visual-tracking system 310 receives video feeds from the video cameras located throughout the facility and uses sophisticated image-tracking techniques to acquire and follow the image of each user as the user moves through the facility. Some visual-tracking systems, in addition to or instead of video images, use other location-identification tokens, such as radio-frequency (RF) tags carried by the users, to acquire and follow the users' positions throughout the facility. In these systems, the visual-tracking system 310 receives feeds from these tokens in addition to or instead of the video feeds from cameras. The visual-tracking system 310 applies the grid shown in FIG. 2 to create, for each user, real-time tracking information that indicates, by grid zone, the user's position within the facility at all times.

The A&T system 300 also includes an authentication system 320, which typically includes or works in conjunction with the authentication terminal described above. The authentication system 320 receives at least two pieces of information for each user—one identifying the user and one authenticating the user. With a card-and-PIN authentication technique, for example, the identification information might include data taken from the card identifying the person or accounts associated with the card and the PIN code encrypted on the card, and the authentication information might include the PIN code entered by the user into the authentication terminal.

A control system 330 receives data from both the visual-tracking system 310 and the authentication system 320 and uses this data to "attach" each user's authentication to that user's position in the facility as the user moves throughout the facility. The data that the control system 330 receives from the visual-tracking system 310 includes real-time positional data indicating the grid location of each object (or user) being tracked by the visual-tracking system. The data that the control system 330 receives from the authentication system 320 includes data identifying each user or identifying other important items, such as the accounts that an authenticated user is allowed to access. The control system 330 uses this information to create a series of real-time authentication packets 340 for users that it delivers to the various touchpoints within the facility as the users move through the facility and into positions to engage the touchpoints. The authentication packets 340 and their contents are described in more detail below.

Figure 4:
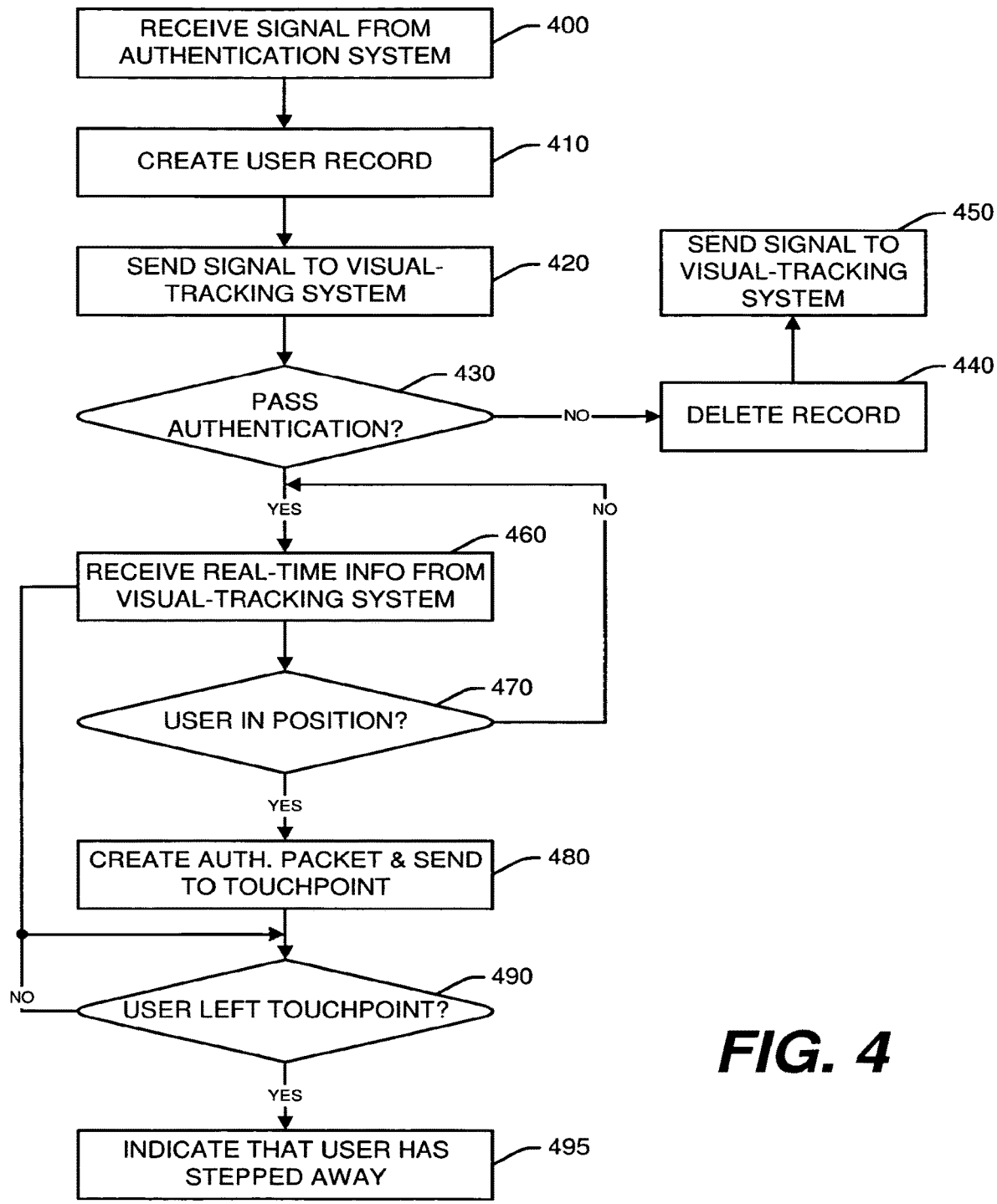
FIG. 4 is a flow diagram for operation of a control system in the A&T system of FIG. 3.

In general, as shown in FIG. 4, when a user enters the facility and engages the authentication terminal (FIG. 1), the control system 330 receives a signal from the authentication system 320 indicating that a new user has entered the facility (step 400). The control system 330 in turn creates a record in a user table (described below) corresponding to the new user (step 410) and delivers a signal to the visual-tracking system instructing it to acquire and begin tracking images of the user at a fixed grid location that is associated with the authentication terminal (step 420). The control system then waits (with respect to this user) for the authentication system to indicate whether the user passes the authentication process (step 430). If the user does not pass authentication, the control system deletes the corresponding user record from the table (step 440) and instructs the visual-tracking system to stop tracking the user (step 450). The user then enters the facility as an unauthenticated user.

When the authentication process succeeds in authenticating the user, the control system receives real-time positional data from the visual-tracking system indicating the position of the user in the facility (step 460). As it receives this data, the control system compares the user's position to fixed grid locations associated with each of the touchpoints in the facility to assess whether the user is in position to engage with any of the touchpoints (step 470). The control system continues this cycle until the user reaches a location that puts the user in position to engage one of the touchpoints. When that occurs, the control system creates an authentication packet and delivers the packet to the touchpoint nearest the user (step 480). The authentication packet, which is described in more detail below, notifies the touchpoint that an authenticated user is standing before it, identifies the user (or the accounts authorized for access by that user), and instructs the touchpoint to establish a session through which the authenticated user (and only that user) can conduct one or more secure transactions with the touchpoint.

In the meantime, the control system continues to monitor the user's position with respect to the fixed grid position associated with the touchpoint and to assess whether the user has moved away from that position (step 490). When the user moves away from the fixed grid position, the control system instructs the touchpoint to halt the session that it has established for the user (step 495). The behavior of both the touchpoint and the control system from this point depend on the business requirements of the establishment that operates them. Some establishments might create a short delay period during which the user can return to the fixed grid position and resume the session at the touchpoint. Other establishments might abort the user's session altogether and require establishment of a new session when the user returns to the touchpoint. Either way, the control system continues to monitor the user's position with respect to the various touchpoints in the facility and notifies a touchpoint when the user is in position to engage that touchpoint. The control system continues monitoring the movement of each user and notifying touchpoints in this manner until the user has exited the facility or the visual-tracking system has lost track of the user.

Figures 5, 6:
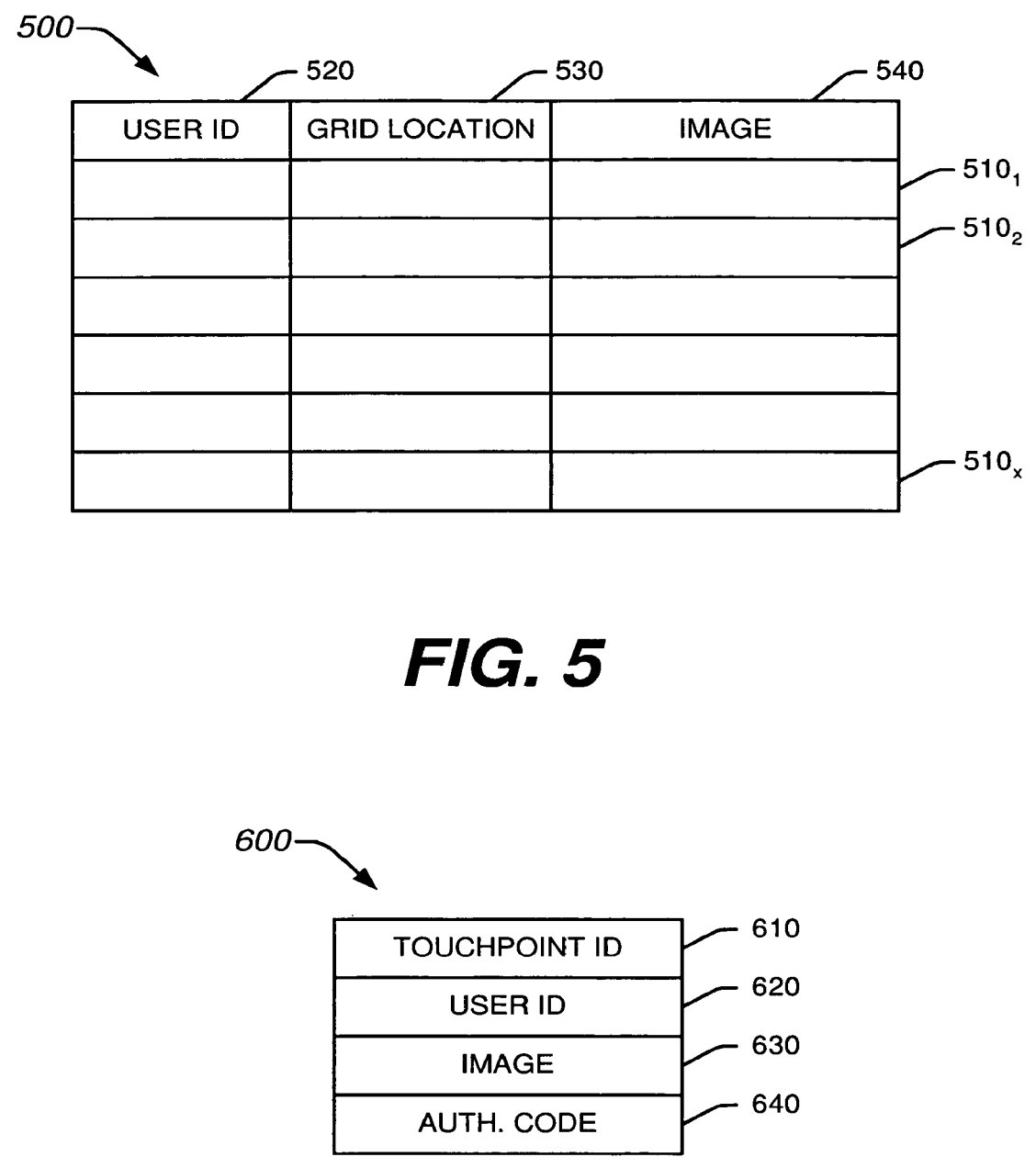

FIG. 5 shows the structure of a relational table 500 created by the control system to maintain a user record $510_{1-X}$ for each user in the facility. The table typically includes, at a minimum, a "user ID" entry 520 and a "grid location" entry 530 for each user. The "user id" entry identifies the user, and the "grid location" entry identifies the user's location within the facility. In some systems, each customer record also includes an "image" entry 540 that stores an image file (or a pointer to the storage location of an image file) that is created by the authentication system during the authentication process. Such an image file would be delivered, for example, to a touchpoint at which a human representative of the business establishment is available to verify that the user standing before the touchpoint is in fact the user for whom the touchpoint has received authentication information.

The control system updates the "grid location" entry in each user record $510_{1-X}$ in real-time as it receives positional data for the corresponding user from the visual-tracking system. When the control system receives an indication that the user has left the facility or that the visual-tracking system has lost track of the user, the control system deletes the corresponding user record $510_{1-X}$ from the table 500.

The control system uses the information stored in the table to create the authentication packets that it delivers to the various touchpoints in the facility. An authentication packet is typically created by taking a snapshot of the information contained in the user record that corresponds to the user who is in position to engage the touchpoint to which the packet is being sent.

FIG. 6 shows the structure of the authentication packet 600. The packet typically includes a "touchpoint ID" field 610 that identifies the touchpoint to which it is being delivered. The packet also includes a "user ID" field 620 that contains the user-identification information stored in the corresponding "user ID" entry of the relational table. If the table stores an image of the user, this image is embedded in an "image" field 630 for packets delivered to certain types of touchpoints (e.g., those operated by a human representative of the business establishment). In some establishments, the authentication packet 600 includes one or more additional fields containing other relevant information, such as an "authentication code" field 640 containing a unique authentication code for use by the touchpoint in connection with the session it will create for the user identified in the packet.

Computer-Based and Other Implementations

The various implementations of the invention claimed below are realized in electronic hardware, computer software, or combinations of these technologies. Most implementations include one or more computer programs executed by a programmable computer. In general, the computer includes one or more processors, one or more data-storage components (e.g., volatile and nonvolatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

The text above describes one or more specific embodiments of a broader invention. The invention also is carried out in a variety of alternative embodiments and thus is not limited to those described here. For example, while the description above relies on examples taken from the banking industry, the invention is applicable in a wide range of other types of facilities, such as post offices, hospitals and medical offices. Many other embodiments are also within the scope of the following claims.

I claim:

1. A method, comprising:
   authenticating a user at an initial transaction terminal within a physical environment comprising the initial transaction terminal and at least one additional transaction terminal;
   tracking the user within the physical environment as an authenticated user based on the authenticating through video captured of the authenticated user within the physical environment;
   detecting the authenticated user at the at least one additional transaction terminal within the physical environment through video; and
   sending a message to the at least one additional transaction terminal that identifies the authenticated user and provides an authentication code permitting the authenticated user to transact at the particular additional transaction terminal without reprocessing the authenticating.

2. The method of claim 1, wherein authenticating further includes obtaining card details for a card read by the initial transaction terminal and an encrypted Personal Identification Number (PIN) entered by the user and encrypted by the initial transaction terminal and using the card details and the encrypted PIN to authenticate the user as the authenticated user.

3. The method of claim 1 further comprising, sustaining the user as the authenticated user while the user is tracked as remaining within the physical environment from the video using additional messages permitting additional transactions of the user within the physical environment.

4. The method of claim 1, wherein authenticating further includes processing a first transaction for the user at the initial transaction terminal.

5. The method of claim 1, wherein sending further includes instructing the at least one additional transaction terminal to terminate a transaction being processed on behalf of the authenticated user at the at least one additional transaction terminal when the authenticated user is detected from the video as moving away from the at least one additional transaction terminal.

6. The method of claim 1, wherein sending further includes instructing the at least one additional transaction terminal to initiate a transaction for interaction by the authenticated user when the authenticated user is detected from the video as standing at the at least one additional transaction terminal.

7. The method of claim 1, wherein tracking further includes tracking the authenticated user from the video based on a grid layout associated with the physical environment.

8. The method of claim 7, wherein tracking further includes assigning the authenticated user to zones within the grid layout as the authenticated user moves through the physical environment.

9. The method of claim 8, wherein detecting further includes identifying that the authenticated user is present within a particular zone known to be associated with the at least one additional transaction terminal.

10. The method of claim 1, wherein sending further includes instructing the at least one additional transaction terminal to halt a transaction session being processed for the authenticated user at the at least one additional transaction terminal when a position of the authenticated user from the video indicates the authenticated user moved away from the at least one additional transaction terminal during the transaction session.

11. The method of claim 10, wherein instructing further includes instructing the at least one additional transaction terminal to resume the transaction session when a new position of the authenticated user indicates that the authenticated user has returned to the at least one additional transaction terminal within a predefined period of time.

12. A method, comprising:
obtaining a grid for a physical environment that defines zones within the physical environment at least some zones comprising transaction terminals for performing transactions;
capturing from video when a user is authenticated for a first transaction at a first transaction terminal based on authentication of the user at the first transaction terminal for the first transaction;
tracking movements of the user with respect to the zones using the video;
detecting the user within a particular zone associated with a second transaction terminal; and
instructing the second transaction terminal to initiate a second transaction for the user and providing an authentication code that authenticates the user for performing the second transaction at the second transaction terminal.

13. The method of claim 12, wherein capturing further includes obtaining authentication credentials used by the user to authenticate for the first transaction from the first transaction terminal.

14. The method of claim 13, wherein obtaining further includes generating the authentication code from the authentication credentials.

15. The method of claim 14 further comprising, iterating the detecting and the instructing when the user is detected within different zones associated with different transaction terminals permitting initiating and processing of additional transactions without requiring the user to resupply the authentication credentials to any of the different transaction terminals while the user remains within the physical environment.

16. The method of claim 12, wherein instructing further includes instructing the second transaction terminal to halt the second transaction when a position of the user within the particular zone indicates that the user has turned away from the second transaction terminal.

17. The method of claim 16, wherein instructing further includes instructing the second transaction terminal to resume the second transaction when a new position of the user within the particular zone indicates the user has returned to the second transaction terminal within a predefined period of time.

18. The method of claim 12, wherein instructing further includes instructing the second transaction terminal to terminate the second transaction when the user moves away from the second transaction terminal within the particular zone.

19. A system, comprising:
a video tracking system configured to track a user within a physical environment based on zones assigned to the physical environment and known locations of transaction terminals within the zones;
an authentication system configured to authenticate the user based on authentication credentials provided by the transaction terminals during transactions of the user at the transaction terminals; and
a control system configured to interact with the video tracking system to:
identify a current location of the user within the physical environment relative to the transaction terminals;
obtain an authentication code from the authentication system based on the authentication credentials provided by the user at a first transaction terminal during a first transaction of the user; and
control the transaction terminals after the first transaction based on the current location of the user within the zones of the physical environment to:
initiate subsequent transactions;
supply the authentication code that authenticates the user for the subsequent transactions without the user being required to resupply the authentication credentials for the subsequent transactions; and
terminate the subsequent transactions.

20. The system of claim 19, wherein the control system is further configured to control the transaction terminals to halt the subsequent transactions and resume any halted subsequent transactions based on positions of the user within the zones indicating the user has moved away from and then returned to the transaction terminals within a predefined period of time.

* * * * *